United States Patent
Lang et al.

(10) Patent No.: US 7,500,309 B2
(45) Date of Patent: Mar. 10, 2009

(54) COLD OR HEAT ACCUMULATOR AND PROCESS FOR ITS MANUFACTURE

(75) Inventors: Robert Lang, Munich (DE); Kemal-Edip Yidirim, Stockdorf (DE); Wolfgang Kraemer, Munich (DE)

(73) Assignee: Webasto Thermosysteme International GmbH, Stockdorf (DE)

( * ) Notice: Subject to any disclaimer, the term of this patent is extended or adjusted under 35 U.S.C. 154(b) by 306 days.

(21) Appl. No.: 11/327,432

(22) Filed: Jan. 9, 2006

(65) Prior Publication Data
US 2006/0112555 A1 Jun. 1, 2006

Related U.S. Application Data

(62) Division of application No. 10/601,554, filed on Jun. 24, 2003, now Pat. No. 7,000,681.

(30) Foreign Application Priority Data
Sep. 11, 2002 (DE) ............... 102 42 069

(51) Int. Cl.
*B21D 39/00* (2006.01)
*B21D 51/18* (2006.01)
*B21D 53/02* (2006.01)
*B21K 21/00* (2006.01)
*B23P 15/26* (2006.01)
*F28D 1/00* (2006.01)
*F28F 1/32* (2006.01)

(52) U.S. Cl. ............ 29/890.03; 29/514; 29/727; 29/890.035; 29/890.043; 165/150; 165/152; 165/171; 165/173

(58) Field of Classification Search .......... 29/890.03, 29/890.035, 890.038, 890.043, 890.07, 727, 29/514; 165/150, 152, 171–173
See application file for complete search history.

(56) References Cited

U.S. PATENT DOCUMENTS 2,038,912 A * 4/1936 Summers ............ 165/150
2,848,200 A * 8/1958 Jacobs ............... 165/150

(Continued)

FOREIGN PATENT DOCUMENTS

DE 199 48 943 C2 4/2001

(Continued)

*Primary Examiner*—David P Bryant
*Assistant Examiner*—Alexander P Taousakis
(74) *Attorney, Agent, or Firm*—Dickinson Wright, PLLC; John M. Naber

(57) ABSTRACT

A cold and/or heat accumulator with a plurality of carrier elements (10) which are charged with a cold or heat storage medium, and with a heat exchanger (12) which is designed to have a heat transfer medium flow through it in order to cause heat exchange between the cold or heat storage medium and the heat transfer medium. The heat exchanger (12) has at least one serpentine hollow section (14), and at least at least one carrier element (10) is provided between the legs of at least some of the loops of the serpentine hollow section. In a process for producing the cold and/or heat accumulator, the height of the carrier elements is coordinated to a distance between the legs of the at least one loop such that, after a force-fit connection is formed between the serpentine hollow section and the carrier elements.

10 Claims, 4 Drawing Sheets

U.S. PATENT DOCUMENTS 3,045,979 A * 7/1962 Huggins et al. ............. 165/152
4,248,291 A   2/1981 Jarmul
4,831,701 A * 5/1989 Yutaka .................. 29/890.054
4,942,654 A * 7/1990 Wright et al. .......... 29/890.035
5,088,548 A   2/1992 Lindner et al.
5,201,119 A * 4/1993 Mizuno et al. ......... 29/890.047
6,035,927 A * 3/2000 Krauss et al. ............... 165/135
6,247,522 B1  6/2001 Kaplan et al.

FOREIGN PATENT DOCUMENTS

WO        WO 98/04644         2/1998

* cited by examiner

COLD OR HEAT ACCUMULATOR AND PROCESS FOR ITS MANUFACTURE

CROSS-REFERENCE TO RELATED APPLICATION

This application is a division of co-pending U.S. patent application Ser. No. 10/601,554.

BACKGROUND OF THE INVENTION

1. Field of the Invention

The invention relates to a cold and/or heat accumulator with a plurality of carrier elements which are charged with a cold or heat storage medium, and with a heat exchanger which is designed to have a heat transfer medium flow through it in order to cause heat exchange between the cold or heat storage medium and the heat transfer medium. Furthermore, the invention relates to a process for producing a cold and/or heat accumulator.

2. Description of Related Art

Cold and/or heat accumulators can be used, for example, in conjunction with climate control of motor vehicles, especially for auxiliary climate control. A cold and/or heat accumulator is known, for example, from published European Patent Application EP 0 914 399 B1. In this publication, it has already been suggested that heat exchange between the cold and/or heat storage medium and the heat transfer medium be effected either by heat exchanger plates or by pipes. In the embodiment which uses heat exchanger plates, it is provided that the carrier elements which are charged with the cold or heat storage medium are arranged in a plate-shape with boundary walls, flow of heat transfer medium being provided between the boundary walls. In the embodiment which uses pipes, it is provided that a carrier element which is charged with the cold or heat storage medium is penetrated by a tube bundle which discharges into common feeds and outlets.

SUMMARY OF THE INVENTION

The primary object of the present invention is to develop a cold and/or heat accumulator and a production process such that improved heat exchange properties between the cold or heat storage medium and the heat transfer medium result and an economical and compact structure is achieved.

This object is achieved by the cold and/or heat accumulator in accordance with the invention having a heat exchanger with at least one serpentine hollow section, at least between some of the loops of which there being at least one respective carrier element. The preferably aluminum serpentine hollow section, relative to its overall dimensions, has a very large surface via which heat exchange occurs between the cold or heat storage medium and the heat transfer medium. In addition to the large surface, the serpentine shape also yields a long flow section for the heat transfer medium; this likewise has an advantageous effect on the heat exchange properties.

In one especially preferred embodiment of the cold and/or heat accumulator in accordance with the invention, it is furthermore provided that the height of the carrier elements is matched to the interval of the serpentines such that there is a force-fitted combination of the serpentine hollow section and the carrier elements. The force-fitted combination is enabled by the spring-elastic properties of the serpentine hollow section. In this way outstanding heat transfer properties can be achieved with a simple structure.

Preferably, in the cold and/or heat accumulator in accordance with the invention, it is provided that there are several serpentine hollow sections located next to one another.

Although this is not absolutely essential, in this connection it is furthermore preferred that the individual serpentines of the serpentine hollow sections which are located next to one another run essentially parallel to one another. One such structure makes it possible in particular for a carrier element to be located between two serpentines of several serpentine hollow sections at a time.

Furthermore, in the cold and/or heat accumulator in accordance with the invention, it is preferably provided that one end segment of the serpentine hollow section is used as the inlet of the heat transfer medium and the other end segment of the serpentine hollow section is used as the outlet of the heat transfer medium.

In this connection, one advantageous development of the cold and/or heat accumulator in accordance with the invention calls for there to be several serpentine hollow sections, of which one end segment at a time is connected to the common inlet of the heat transfer medium, the other end segment at the time being connected to a common outlet of the heat transfer medium. This approach makes it possible for the heat transfer medium to flow in parallel through several serpentine hollow sections. The number of serpentine hollow sections used can be chosen depending on the desired flow rate of the heat transfer medium.

In preferred embodiments of the cold and/or heat accumulator in accordance with the invention, it is furthermore provided that it has a housing in which there are at least carrier elements which are charged with the cold and/or heat storage medium and the heat exchanger. The housing can be made cuboidal for example, preferably a cuboidal surface being made as the housing cover. The housing can be produced fundamentally from any suitable material, but preferably has good heat insulation properties in order to minimize heat exchange between the cold or heat storage medium and the vicinity of the housing.

In this connection, it can furthermore be advantageously provided that at least some intermediate spaces are foamed between the housing and the carrier elements charged with the cold and/or heat storage medium and the heat exchanger. Foams can be, for example, PU foams. Foaming not only improves the insulation properties, but furthermore leads to the desired vibration attenuation. Depending on the embodiment, the foams can furthermore define the location of the combination of the heat exchanger and the carrier elements within the housing.

In especially preferred embodiments of the cold and/or heat accumulator in accordance with the invention, it is furthermore provided that the carrier elements are formed by one or more plates, especially by graphite plates.

Furthermore, it is preferred that the cold or heat storage medium is a phase changing material, for example, water or paraffin. Of course, also other phase changing materials which are well known to one skilled in the art can be used.

Furthermore, in one preferred embodiment of the cold and/or heat accumulator in accordance with the invention, it is provided that, between the carrier elements and the heat exchanger, there is corrosion protection at least in sections. The corrosion protection prevents contact corrosion between the preferably aluminum heat exchanger and the carrier elements which are charged with the cold or heat storage medium and which can be especially a water-filled graphite matrix. The corrosion protection can be, for example, plastic jacketing of the carrier elements and/or a surface coating of the heat exchanger. But other embodiments are also conceivable in which corrosion protection can be abandoned, for example, embodiments in which the heat exchanger or the serpentine hollow sections are made of plastic.

The process in accordance with the invention for producing a cold and/or heat accumulator, especially a cold and/or heat accumulator in accordance with the invention, comprises the following steps:

a) fabrication of carrier elements and charging of the carrier elements with a cold and/or heat storage medium, b) fabrication of a heat exchanger which comprises at least one serpentine hollow section, and c) joining of the carrier elements and the heat exchanger by the following steps:

c1) Application of a force for elastic enlargement of the distance between at least two serpentines, c2) Arrangement of at least one carrier element in the enlarged interval between two serpentines, and c3) Removal of the force.

This process can be carried out comparatively easily, and thus economically, and yields a cold and/or heat accumulator which has outstanding properties for heat exchange between the cold or heat storage medium and the heat transfer medium due to the serpentine configuration of the heat exchanger. Otherwise, the process in accordance with the invention yields the advantages explained using the cold and/or heat exchanger in accordance with the invention in the same or similar manner, for which reason reference is made to the corresponding statements to avoid repetitions.

The same applies in a general sense to the following preferred embodiments of the process in accordance with the invention, also with respect to the advantages which can be achieved by these developments reference being made to the respective corresponding explanations in conjunction with the cold and/or heat accumulator in accordance with the invention.

In especially preferred embodiments of the process in accordance with the invention, it is provided that, in the implementation of step a) and/or of step b), the height of the carrier elements is matched to the distance of the serpentines such that, after carrying out step c), there is a force-fitted combination of the serpentine hollow section and the carrier elements.

Furthermore, the process in accordance with the invention relates to embodiments in which it is provided that fabrication of the carrier elements according to step a) comprises cutting to size and optionally stacking of one or more carrier material plates, especially of one or more graphite plates.

In the process in accordance with the invention it is furthermore provided that a phase changing material, for example water or paraffin, is used as the cold or heat storage medium.

Furthermore, it is regarded as especially advantageous if the process in accordance with the invention has several serpentine hollow sections located next to one another.

In this connection, one preferred development of the process in accordance with the invention calls for the individual loops of the serpentine hollow sections which are located next to one another to be located essentially parallel to one another.

In general, in the process in accordance with the invention, it is preferred that one end segment of the serpentine hollow section is made as the inlet of the heat transfer medium and the other end segment of the serpentine hollow section is made as the outlet of the heat transfer medium. In doing so, it can be especially provided that there are several serpentine hollow sections, of which one end segment is connected to the common inlet of the heat transfer medium, and the other end segment is connected to the common outlet of the heat transfer medium.

In one preferred development of the process in accordance with the invention, it furthermore comprises the following additional step of:

d) providing a housing and inserting the carrier elements which are charged with the cold or heat storage medium and the heat exchanger which has been joined to them into the housing.

Here, it is considered advantageous if, in addition, there is the following step of:

e) foaming of at least some intermediate spaces between the housing and the carrier elements which have been charged with the cold or heat storage medium or the heat exchanger.

Furthermore, it is especially preferred that, before carrying out step c), there is corrosion protection is provided at least in sections between the carrier elements and the heat exchanger.

Preferred embodiments of the invention are explained below by way of example with reference to the accompanying drawings.

DETAIL DESCRIPTION OF THE INVENTION

Figure 1:
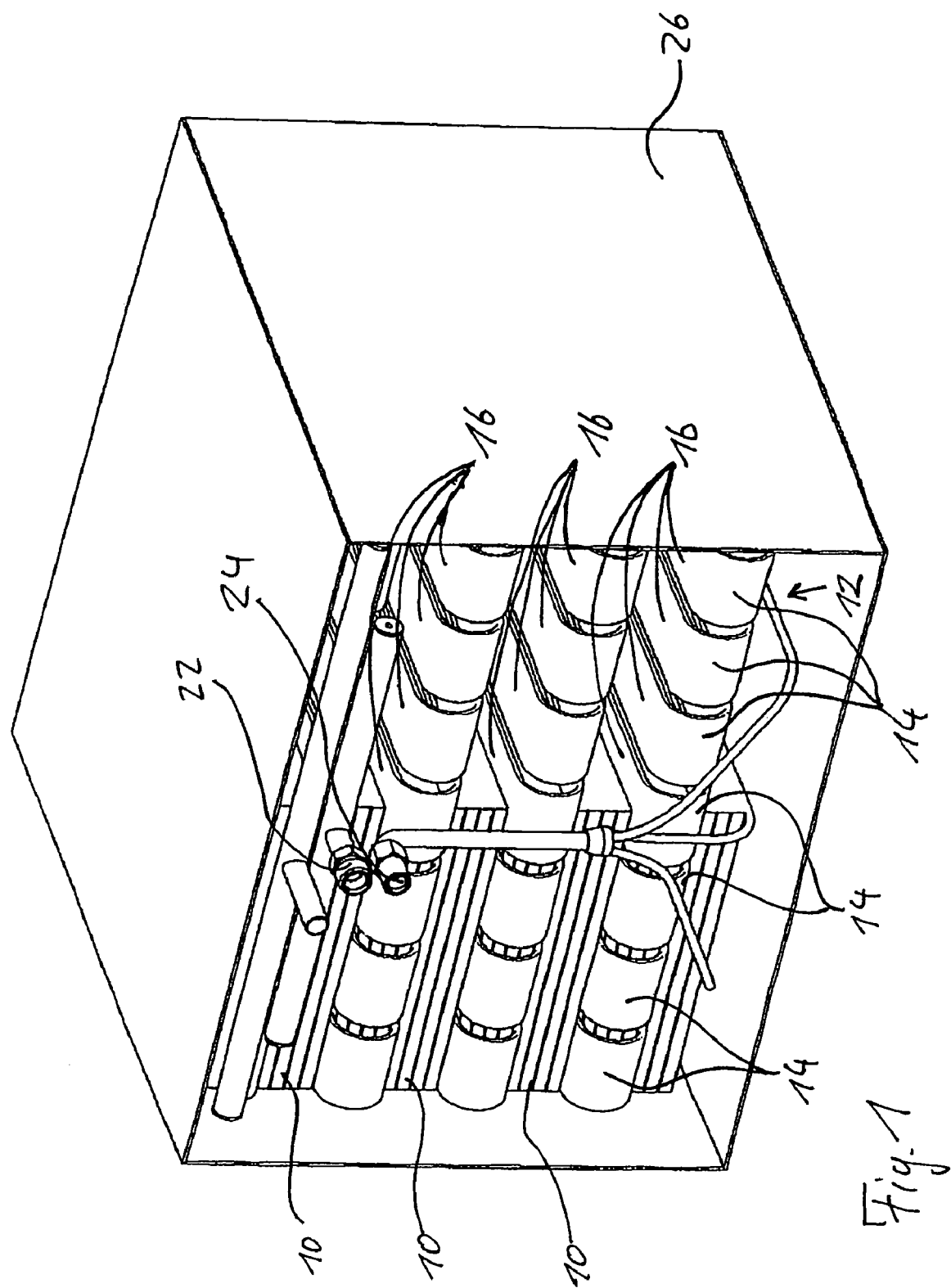
FIG. 1 is a schematic perspective view of one embodiment of the cold and/or heat accumulator in accordance with the invention which can be produced by the process in accordance with the invention.

FIG. 1 shows a schematic of one embodiment of the cold and/or heat accumulator in accordance with the invention which can be produced by the process in accordance with the invention. The cold and/or heat accumulator shown has a housing 26 in which there are the heat exchanger 12 and several carrier elements 10 in the form of graphite plates. The housing 26, in practice, is closed by a housing cover which is not shown. Furthermore, in the area of the heat exchanger 12 which is on the right in FIG. 1, for illustration of the structure of the heat exchanger 12, the carrier elements 10 have been omitted, although in practice there are also carrier elements 10 in the right-hand area of the heat exchanger 12. The heat exchanger 12, in this case, has seven serpentine hollow sections 14 which are located next to one another such that the individual loops 16 of the serpentine hollow sections 14 run parallel to one another. Each of the serpentine hollow sections 14 has an end segment which is used as the inlet of the heat transfer medium and an end segment which is used as the outlet of the heat transfer medium, one end segment each of of the serpentine hollow sections 14 being connected to the common inlet 22 for the heat transfer medium, while the other end segment of each of the serpentine hollow sections 14 is connected to a common outlet 24 for the heat transfer medium. Although this is not shown, intermediate spaces between the housing 26 and the heat exchanger 12 or the carrier elements 10 are preferably filled with foam, in practice.

Figure 2:
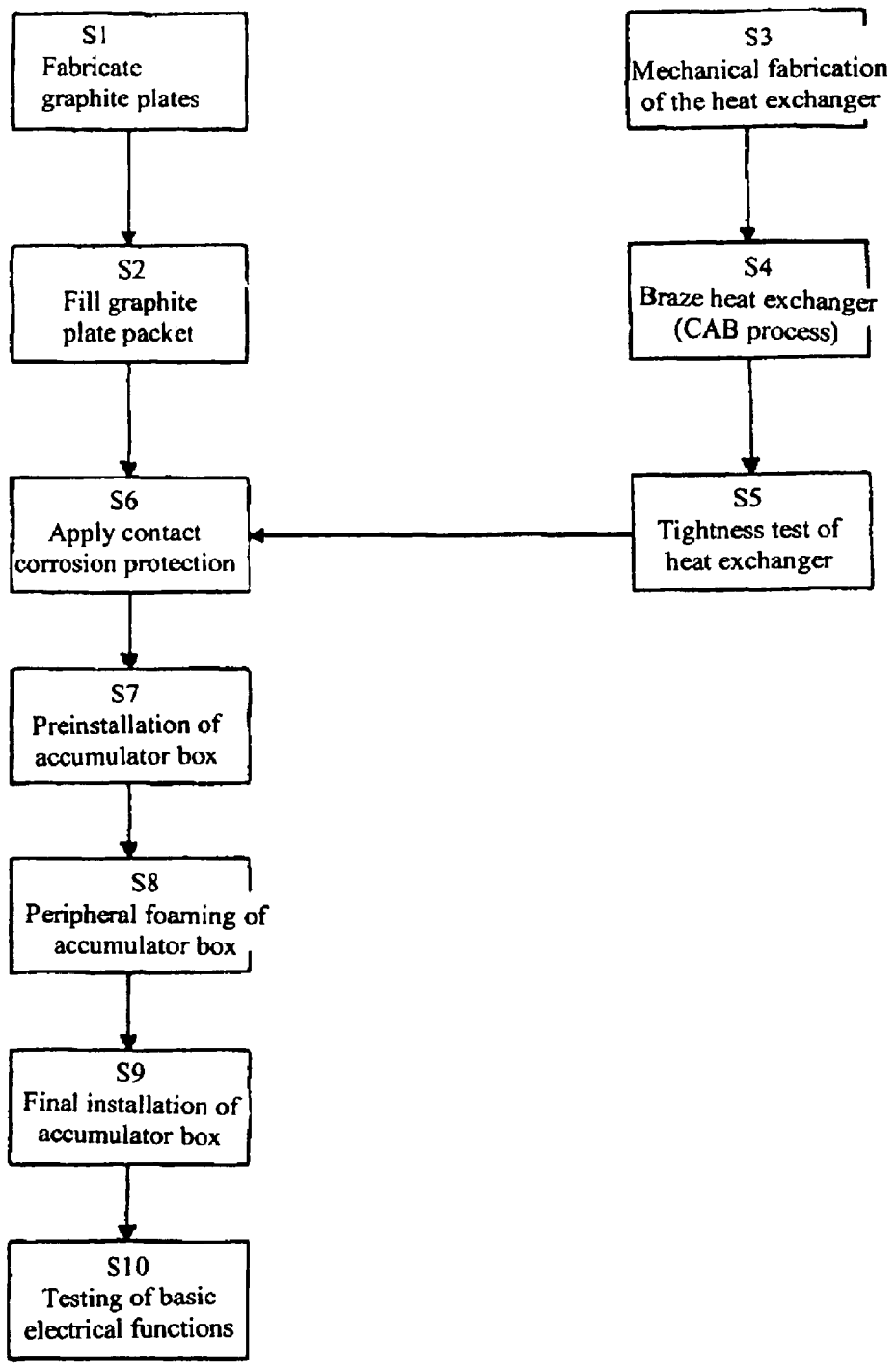
FIG. 2 is a flow chart which illustrates the steps of one embodiment of the process in accordance with the invention with which the cold and/or heat accumulator as shown in FIG. 1 can be produced.

FIG. 2 shows a flow chart which illustrates one possible embodiment of the process in accordance with the invention, with which the cold and/or heat accumulator as shown in FIG. 1 can be produced. In the embodiment shown, graphite plates are used as the carrier elements 10, for which reason graphite plate fabrication takes place in step S1. For this purpose, graphite plates are cut to size and layered into packets according to the size of the carrier element 10 which is to be produced.

In step S2, the graphite plates are charged with a cold or heat storage medium, for example, with water or paraffin, hereafter referred to a thermal storage medium. The graphite plate packets are filled in a vacuum in order to accelerate saturation of the graphite plate packets with the thermal storage medium. To safeguard the process, the graphite plate packets are weighed before filling. The thermal storage medium is preferably supplied via a metering unit depending on the size of the current graphite plate packets being filled. Alternatively, it is possible to work without a special metering unit if intentional overfilling is carried out, i.e., for example, saturation of the graphite plate packets with thermal storage medium of more than 85%. In this case, exact filling is ensured via a downstream drying process. In doing so, the filled graphite plate packet is dried, for example, with hot air as it is continuously weighed until the total weight corresponds to the desired degree of filling.

The steps S1 and S2, which are shown in FIG. 2, thus correspond to process step a) mentioned above.

The steps S3 to S6 shown in FIG. 2 illustrate one possibility for implementing process step b).

In step S3 mechanical production of the heat exchanger 12 from an aluminum hollow section takes place. For this purpose, the section is withdrawn from a coil and calendered. Afterwards, the calendared section passes through a bending machine to producing the required serpentine loops 16. At the end of the bending process, the section is cropped to size and the ends 18, 20 are worked for a subsequent brazing process by embossing.

In step S4, brazing of the heat exchanger 12 takes place, for example, by a CAB process. To do this, the heat exchanger 12 is prefabricated in a vise, i.e., the serpentine hollow section is joined to a brazing filler metal-coated and flux-coated distributor pipe and brazing filler metal-coated end caps for the distributor pipe and a brazing filler metal-coated fitting which is intended for the line connection, and they are braced to one another. Then, the brazing takes place in a furnace at roughly 600° C. in a predominant nitrogen atmosphere.

In step S5, a tightness test of the heat exchanger 12 is carried out. After brazing and cooling of the heat exchanger 12, this tightness test is carried out according to the DIN with helium, or alternatively with hydrogen, as the test gas. The heat exchanger 12 is placed in a chamber with helium or hydrogen detectors and flooded with the corresponding test gas. The amount of test gas emerging from the heat exchanger 12, and thus the tightness, can be ascertained via the detectors.

In step S6, the heat exchanger 12 is provided with corrosion protection. The corrosion protection is used to prevent contact corrosion between the aluminum heat exchanger 12 and the filled graphite matrix. Corrosion protection is provided in the form of a surface coating of the heat exchanger 12, a powder coating or enameling using the KTL process being possible. Alternatively, the filled graphite matrix can be jacketed, for example, with a plastic film. Both single-layer and also multi-layer jackets are possible for increasing the water vapor impermeability.

Figure 3:
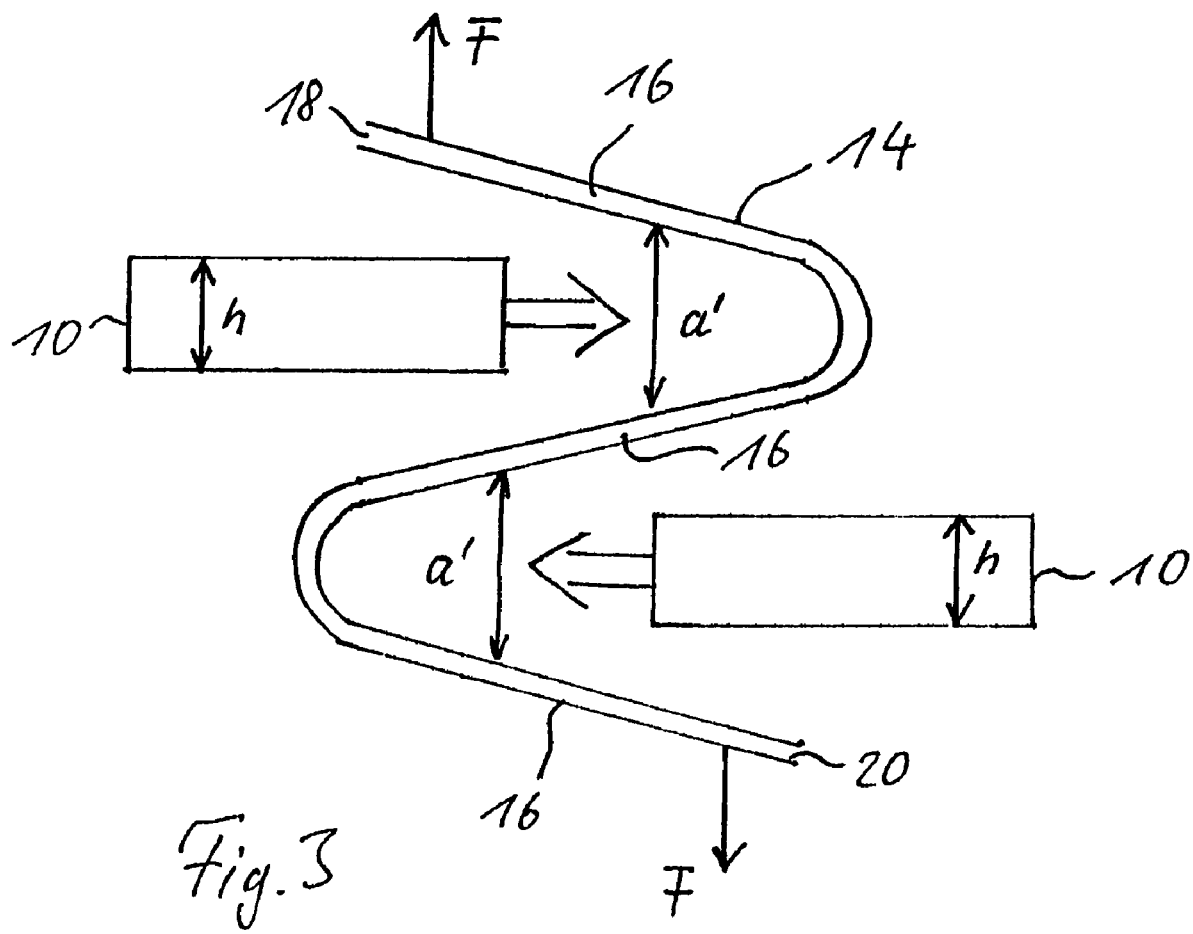
FIG. 3 shows a schematic which illustrates the implementation of steps c1) and c2) of the process in accordance with the invention.

Step S7, which is shown in FIG. 3, corresponds to the above described process step c) and can be designated pre-installation of the cold and/or heat accumulator. First, the carrier elements 10 or the filled graphite plate packets and the heat exchanger 12 are joined to one another. For this purpose, the serpentine loops 16 of the heat exchanger 12, in the elastic area, are widened with application of a force F, i.e., the distance a'_between the individual serpentine loops 16 is increased in order to be able to place the individual carrier elements 10 between the serpentines 16 of the heat exchanger 12. Here, the carrier elements 10 or the graphite plate packets have an overdimension, i.e., the height h of the packets is larger than the radius of the section bends. After placing the carrier elements 10 between the serpentine loops 16, the force F which is present is removed and the serpentine loops 16 spring back toward their original position. In this way, a force-fitted connection between the heat exchanger 12 and the individual carrier elements 10 is achieved. Then, according to the process step d), the carrier elements 10 charged with the cold or heat storage medium and the heat exchanger 12 joined to them are placed, oriented in position, into the housing 26 in order to be mounted there.

Step S8, which is shown in FIG. 2, corresponds to the process step e) and can be designated the foaming of the cold and/or heat accumulator. It is pointed out here that, as an alternative to the procedure described here, embodiments are also possible for the process in accordance with the invention, in which the combination of the carrier elements 10 and the heat exchanger 12 is peripherally foamed before insertion into the housing. In any case, the peripheral foaming is used to damp vibrations and to insulate the cold and/or heat accumulator, the peripheral foaming being carried out preferably such that the carrier elements 10 or the graphite plate packets and the heat exchanger 12 are jacketed uniformly with a polyurethane (PU) foam. This can be achieved especially by a two-part foaming process. Especially to avoid spaces in the housing or alternatively in the foaming tool, during a pre-foaming process of one cuboidal side of the housing, PU foam can be introduced in a defined manner. In this way, the combination of the carrier elements 10 and the heat exchanger 12 in the housing 26 or in the foaming tool is lifted to the final position. In a downstream finish-foaming process, the remainder of the housing 26 or foaming tool is foamed.

According to FIG. 2, in step S9, the finish-mounting of the cold and/or heat accumulator takes place, in this step additional attachment parts being mounted. Furthermore sensors are attached and a cable harness is installed.

In step S10, testing of the basic electrical functions is done as a conclusion, the cold and/or heat accumulator being checked for whether the electrical wiring is correct and the sensors work properly.

To carry out the process in accordance with the invention, especially diverse handling means and the following machines or systems can be used:
- a filling machine which comprises the vacuum pump for filling the carrier elements 10 with the cold or heat storage medium,
- a special machine for aligning, bending, cropping and end-working of the heat exchanger 12,
- a brazing furnace with a nitrogen chamber,
- a test chamber for the tightness test with helium or hydrogen, and
- a PU foaming machine with a foaming tool which is specific to the workpiece.

FIG. 3 schematically illustrates the execution of steps c1) and c2) of the process in accordance with the invention. In doing so, the ends 18, 20 of the serpentine hollow section 14 are pulled apart by a force F such that the distance between the serpentine loops 16 is increased to an enlarged distance a'. Then, the carrier elements 10 are inserted between the individual serpentine loops 16, the carrier elements 10, with respect to their height h having a certain overdimension relative to the distance a which results between the serpentine loops 16 in the rest position when the force F is removed (FIG. 4).

Figure 4:
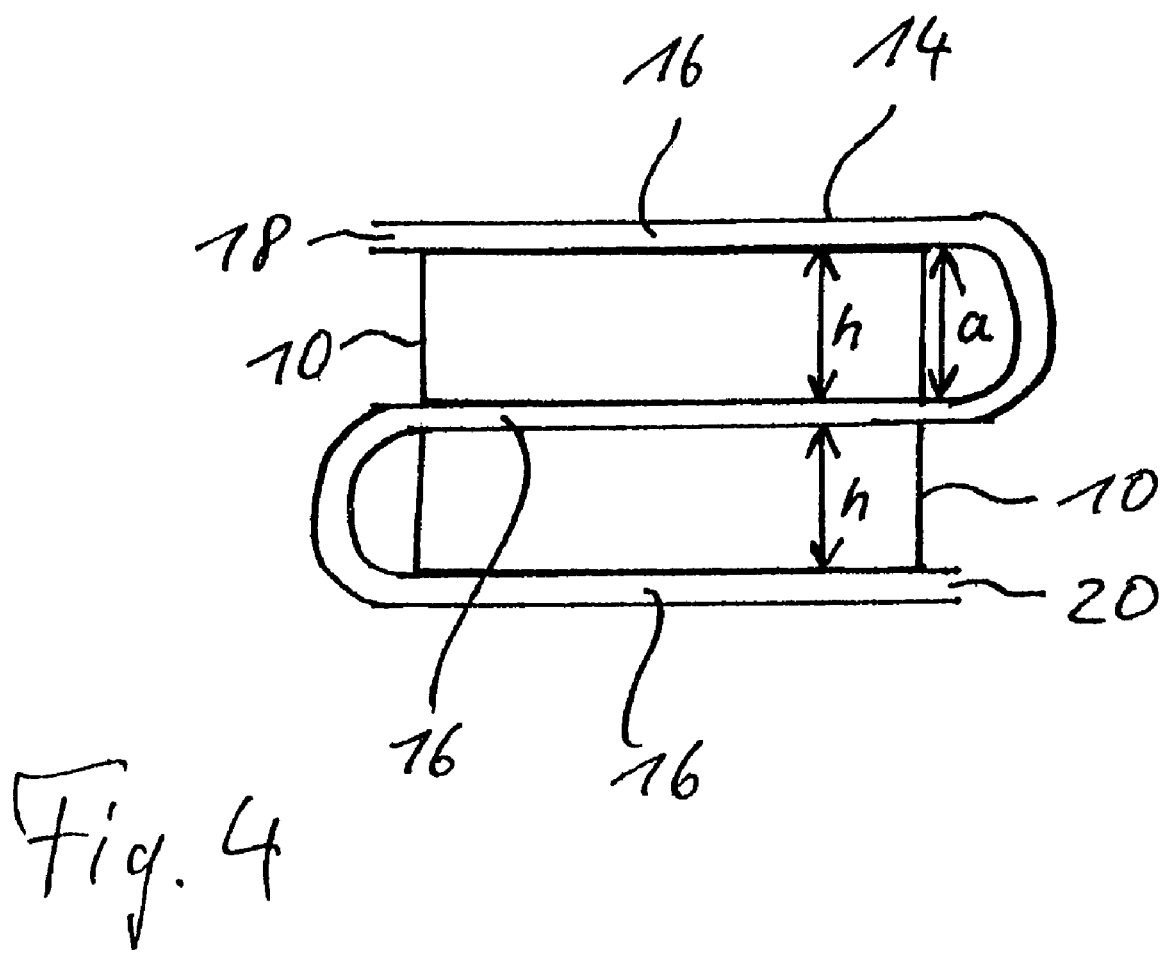
FIG. 4 is a schematic illustration of the arrangement of the carrier elements within a serpentine hollow section for the cold and/or heat accumulator as shown in FIG. 1, this arrangement arising after the implementation of step c3) of the process in accordance with the invention.

FIG. 4 schematically shows the arrangement of the carrier elements 10 within a serpentine hollow section 14 for the cold and/or heat accumulator as shown in FIG. 1, this arrangement arising after carrying out the step c3) of the process in accordance with the invention. After removing the force F, the serpentine hollow section 14 and the carrier elements 10 which are located between its serpentine loops 16 form a combination which yields outstanding heat transfer properties for heat exchange between the cold or heat storage medium which is provided in the carrier elements 10 and the heat transfer medium which is supplied to the end segment 18 of the serpentine hollow section 14 and is discharged on the end segment 20 of the serpentine hollow section 14.

The features of the invention disclosed in the aforementioned description, in the drawings and in the claims can be important both individually and also in any combination for implementation of the invention.

What is claimed is:

1. Process for producing a thermal accumulator having a plurality of carrier elements which are charged with a thermal storage medium, and a heat exchanger through which a heat transfer medium is flowable in heat exchange relationship to said thermal storage medium, said process comprising the steps of:
    a) fabricating of the carrier elements and charging of the carrier elements with a thermal storage medium, wherein fabrication of the carrier elements comprises cutting to size and stacking a plurality of graphite carrier material plates,
    b) fabricating a heat exchanger comprised of at least one serpentine hollow section, and
    c) joining of the carrier elements and the heat exchanger by the following steps:
        c1) applying force for elastic enlargement of a space between legs of at least one loop of the at least one serpentine hollow section;
        c2) arranging at least one carrier element in the enlarged space between the legs of the at least one loop of the at least one serpentine hollow section, and
        c3) releasing the applied force.

2. Process in accordance with claim 1, wherein the implementation of at least one of step a) and step b), the height of the carrier elements is coordinated to a distance between legs of said at least one loop such that, after carrying out step c), a force-fit connection is formed between the serpentine hollow section and the carrier elements.

3. Process in accordance with claim 1, wherein the thermal storage medium is a phase changing material.

4. Process in accordance with claim 1, wherein a plurality of serpentine hollow sections are arranged next to one another.

5. Process in accordance with claim 4, wherein individual loops of the serpentine hollow sections located next to one another run essentially parallel to each another.

6. Process in accordance with claim 1, wherein a first end segment of the serpentine hollow section is used as an inlet for the heat transfer medium and a second end segment of the serpentine hollow section is used as an outlet for the heat transfer medium.

7. Process in accordance with claim 6, wherein a plurality of serpentine hollow sections are arranged next to one another and wherein the first end segment of each of the serpentine hollow sections is connected to a common inlet for the heat transfer medium, and the second end segment of each of the serpentine hollow sections is connected to a common outlet for the heat transfer medium.

8. Process in accordance with claim 1, comprising the further step of:
    d) providing a housing and inserting the carrier elements and the heat exchanger to which the carrier elements have been joined into the housing.

9. Process in accordance with claim 8, comprising the further step of:
    e) filing at least some intermediate spaces between the housing and the carrier elements and the heat exchanger with an insulating foam.

10. Process in accordance with claim 8, wherein, before carrying out step c), a corrosion protection is applied between the carrier elements and the heat exchanger, at least in sections.

* * * * *